(12) United States Patent
Tian

(10) Patent No.: US 9,976,585 B2
(45) Date of Patent: May 22, 2018

(54) CONNECTION STRUCTURE FOR WOODWARE PART

(71) Applicant: Shengjun Tian, Zhengzhou (CN)

(72) Inventor: Shengjun Tian, Zhengzhou (CN)

( * ) Notice: Subject to any disclaimer, the term of this patent is extended or adjusted under 35 U.S.C. 154(b) by 0 days. days.

(21) Appl. No.: 15/023,979

(22) PCT Filed: Sep. 18, 2014

(86) PCT No.: PCT/CN2014/000851
§ 371 (c)(1),
(2) Date: May 24, 2016

(87) PCT Pub. No.: WO2015/039407
PCT Pub. Date: Mar. 26, 2015

(65) Prior Publication Data
US 2016/0348704 A1 Dec. 1, 2016

(30) Foreign Application Priority Data
Sep. 23, 2013 (CN) ..................... 2013 2 0619002 U

(51) Int. Cl.
*F16B 12/14* (2006.01)
*F16B 7/18* (2006.01)
(Continued)

(52) U.S. Cl.
CPC ............ *F16B 7/187* (2013.01); *F16B 12/125* (2013.01); *F16B 15/00* (2013.01); *F16B 21/12* (2013.01)

(58) Field of Classification Search
CPC .......... F16B 5/0283; F16B 7/18; F16B 7/187; F16B 12/14; F16B 12/20; F16B 2012/103;
(Continued)

(56) References Cited

U.S. PATENT DOCUMENTS 1,335,617 A * 3/1920 Solomon ............. E04H 12/2253
52/296
1,734,340 A * 11/1929 Overton .................. F16B 12/48
108/156
(Continued)

FOREIGN PATENT DOCUMENTS

CN 202218717 5/2012
CN 202579540 12/2012
(Continued)

OTHER PUBLICATIONS

International Search Report issued in the corresponding International PCT application No. PCT/CN2014/000851, dated Nov. 21, 2014, 5 pages.

*Primary Examiner* — Michael P Ferguson
(74) *Attorney, Agent, or Firm* — Hamre, Schumann, Mueller & Larson, P.C.

(57) ABSTRACT

The present invention provides a connection structure for a woodware part. Firstly, an implanting hole (4) is drilled at an appropriate location on the contact surface of a second woodware part (5), a through embedding hole (9) is drilled on the side surface of the second woodware part (5), the central lines of the implanting hole and the embedding hole are perpendicular to and intersect with each other, a wooden nut (6) is placed into the implanting hole (4), the central line of a nail penetration hole (8) on the wooden nut (6) and the central line of the embedding hole (9) are overlapped, and a round nail (10) is embedded along the embedding hole and the nail penetration hole; a through bolt hole (2) is drilled at a corresponding location on the contact surface of a first woodware part (3), and finally, the connection of the first and second woodware parts is realized by screwing a bolt (1) into the wooden nut through the bolt hole; the problems that firmness and rapidness of the connection structure are not unified and that the woodware part cannot be recycled (Continued)

between old and new woodware of the same model are solved; and the connection structure has the advantages of improving utilization ratio of wood, saving energy and protecting the environment, and manufacturers can realize carbon trading.

1 Claim, 1 Drawing Sheet

(51) Int. Cl.
    *F16B 12/12*       (2006.01)
    *F16B 15/00*       (2006.01)
    *F16B 21/12*       (2006.01)

(58) Field of Classification Search
    CPC .... F16B 2012/106; F16B 21/12; F16B 37/04; F16B 41/002
    See application file for complete search history.

(56) References Cited

U.S. PATENT DOCUMENTS

| 3,469,869 | A | * | 9/1969 | Ramakers | F16B 12/14 403/264 |
| 4,008,971 | A | * | 2/1977 | Wah | F16B 7/18 403/237 |
| 4,261,665 | A | * | 4/1981 | Hsiung | F16B 12/14 403/217 |
| 2008/0226420 | A1 | | 9/2008 | Huang | |

FOREIGN PATENT DOCUMENTS

| CN | 203305138 | | 11/2013 | |
| CN | 203770312 | | 8/2014 | |
| FR | 1 265 305 | * | 5/1961 | ............. F16B 12/14 |
| JP | 2008128334 | | 6/2008 | |

* cited by examiner

CONNECTION STRUCTURE FOR WOODWARE PART

FIELD OF THE INVENTION

The present invention relates to a novel connection structure for a woodware part, which is suitable for the field of woodware production and is used for connecting a first woodware part and a second woodware part which are adjacent to each other.

BACKGROUND OF THE INVENTION

In the field of woodware production, an all-known connection structure is a tenon and mortise connection structure, and this connection structure has the advantage of connection firmness and has the disadvantages of relatively high production cost, transportation cost and price. A nail connection structure and a connection structure adopting a bolt and inner and outer tooth nuts have the advantages of fastness and high efficiency and have the disadvantages of relatively low reliability and firmness. The performance is more obvious especially on locations with larger stress, that is, as people often say that nail gets out and inner and outer tooth nuts become loose, the woodware falls apart seriously to lose the practical function. The above connection structures have the common defects that designers do not take the recycle of woodware parts between old and new woodware with the same model into account, such that the woodware is difficult to be demounted, the parts and the connection structures of the woodware are damaged and the reuse cost is too high; or, the connection structures are not firm and are damaged easily, and thus the service life of the woodware is short. The result is that timber is wasted, the utilization rate of the wood is low, and the woodware parts cannot be recycled between the old and new woodware with the same model. The novel connection structure for the woodware part invented by the inventor can overcome the defects of the above connection structures, improve the utilization rate of the timber and save the timber.

SUMMARY OF THE INVENTION

The novel connection structure for the woodware part is proposed for overcoming the defects of the above defects, and solving the problems that the firmness and fastness of the connection structure are not unified and that the woodware parts cannot be recycled between the old and new woodware with the same model. To this end, the inventor designs a built-in nut for connection, and this novel nut is named as a wooden nut. The inventor invents the novel connection structure for the woodware part and a novel technical solution suitable for application. Finally, the uniformity of the firmness and fastness of the connection structure can be realized, the woodware parts are recycled between the old and new woodware with the same model, the utilization rate of the timber is improved, the waste is reduced, the energy is saved, the emission of carbon dioxide is reduced, the demands of people on the timber are satisfied without increasing the woodcut, the forest resources are protected, and the damaged ecological environment is gradually restored.

The connection structure for the woodware part includes a first woodware part and a second woodware part which are adjacently connected; the connection of the first and second woodware parts is realized by screwing a bolt into a wooden nut in an implanting hole of the contact surface of the second woodware part through a bolt hole on the contact surface of the first woodware part; wherein, the wooden nut and a round nail are used for fixing the wooden nut in the implanting hole of the contact surface of the second woodware part through an embedding hole and a nail penetration hole, the central line of the embedding hole and the central line of the implanting hole are perpendicular to and intersect with each other, and the central line of the embedding hole and the central line of the nail penetration hole on the wooden nut are overlapped.

After the approval of the application document, the novel connection structure for the woodware part will be named as "Tian's connection method".

(1) The wooden nut is an elongated round nut provided with a through small round hole on the side wall of one end, the main features of the appearance thereof are as follows: 1. the outer wall of the wooden nut is smooth, the inner wall is provided with straight threads, the through small round hole is arranged on the side wall of one end, and this small round hole is named as the nail penetration hole. 2. The central line of the nail penetration hole and the central line of the elongated round nut are perpendicular to and intersect with each other. 3. The diameter of the nail penetration hole is 0.4-0.5 time as large as the diameter of the elongated round nut, and an appropriate distance with the near end of the elongated round nut is 2-5 mm. 4. An appropriate outside diameter of the wooden nut is 4-10 mm, and the length is 20-60 mm.

The wooden nut is an important component for realizing the novel connection structure for the woodware part. The nail penetration hole is the key point of the design, and a front view can best embody the features of the nail penetration hole.

(2) Technical solution used for solving the technical problems of the present invention 1. The first woodware part and the second woodware part adjacent to each other are provided. Firstly, the second woodware part is fixed on a worktable, a non-through wooden hole with a diameter 0.1 mm larger than the outside diameter of the wooden nut is drilled at an appropriate location on the contact surface of the second woodware part by an electric hand drill (the central line of a drill bit is perpendicular to the contact surface), and the wooden hole is named as the implanting hole; the central line of the drill bit is perpendicular to the central line of the implanting hole, a through small round hole is drilled on the side surface of the second woodware part, the central line of the small round hole and the central line of the implanting hole are perpendicular to and intersect with each other, the diameter of the small round hole is 1-2 mm smaller than the diameter of the nail penetration hole, this small round hole is named as the embedding hole, and an appropriate distance from the embedding hole to the contact surface is 20-50 mm. When the central line of the wooden hole on the contact surface of the second woodware part is not perpendicular to the contact surface, or the through wooden hole, the connection can also be realized; but the connection is not the most firm, or the bolt and the wooden nut are liable to rust, and thus is not the optimal selection. The position of the embedding hole can be determined by a wooden nut implanter (Chinese Patent No. ZL201220686813.7) or a known mathematical method.

2. A 60 mm long bolt is picked up, a location provided with threads is 6 mm long, and the threads can be engaged with straight threads on the inner wall of the wooden nut. The end having no nail penetration hole of the wooden nut is screwed in the bolt and is screwed down. This bolt is named as a fixing bolt.

3. An electric light source is placed below the second woodware part, and the light can irradiate the lower opening of the embedding hole.

4. Saw dust in the implanting hole and the embedding hole is removed.

5. The fixing bolt is taken by a left hand, then the wooden nut is inserted into the implanting hole, and the distance from the left hand finger to the central line of the nail penetration hole is equal to the distance from the central line of the embedding hole to the contact surface of the second woodware part. The fixing bolt is rotated until the diameter of a facula is equal to the diameter of the embedding hole when being seen downward, so as to fix the wooden nut. At this time, the central line of the nail penetration hole and the central line of the embedding hole are overlapped.

6. The round nail is inserted along the embedding hole. The diameter of the round nail is 0.1-0.2 mm smaller than the diameter of the nail penetration hole, and the round nail cannot protrude from the embedding hole. The round nail is impacted into the embedding hole by a woodworking hammer by a right hand, and the wooden nut is fixed in the implanting hole of the second woodware part by the round nail through the nail penetration hole.

7. The fixing bolt is taken off.

8. A through bolt hole is dripped at a corresponding position of the contact surface of the first woodware part, and the diameter of the bolt hole is 0.1 mm larger than the diameter of the bolt. If the wooden nut protrudes from the contact surface of the second woodware part, the bolt hole on the contact surface of the first woodware part should be expanded until the diameter thereof is equal to that of the implanting hole, and the depth of the bolt hole is large enough to accommodate the protruding wooden nut.

9. A bolt is screwed in the wooden nut in the implanting hole of the second woodware part through the bolt hole of the first woodware part to connect the two, and the length of the bolt screwing in the wooden nut is not less than 5 mm, and the bolt cannot touch the round nail.

(3) Beneficial effects: 1. the novel connection structure for the woodware part is a standard basic technology of the wooden parts. 2. Woodware produced by the novel connection structure for the woodware part can realize unified firmness and fastness of the connection structure, the connection structure will not be damaged when disassembling and assembling the woodware, the woodware parts can be recycled between old and new woodware of the same model, the energy is saved, the environment is protected, the utilization rate of the timber is improved, and the manufacturers can obtain carbon emission reduction to lay a foundation for carbon trading. 3. The novel connection structure for the woodware part can be used for improving the quality, reducing the production difficulty, ensuring convenient maintenance and prolonging the service life of the woodware. 4. The woodware produced by the novel connection structure for the woodware part is stable and reliable in quality, and the technical solution is suitable for industrial production. A carbon dioxide emission benchmark of the woodware industry can be formulated with the technology as the basis. 5. The novel connection structure for the woodware part, recycle of the woodware parts between old and new woodware of the same model and conscious joint action (promotion policy) can be combined to form a powerful force of protecting the forest resources and gradually restoring the damaged ecological environments, so as to achieve harmonious coexistence of human and the ecological environments at last. 6. The novel connection structure for the woodware part can be used for connecting with or separating metal or plastic parts from the woodware parts firmly and quickly without damaging the connection structure.

In the figures: 1 represents a bolt, 2 represents a bolt hole, 3 represents a first woodware part, 4 represents an implanting hole, 5 represents a second woodware part, 6 represents a wooden nut, 7 represents an electric light source, 8 represents a nail penetration hole, 9 represents an embedding hole, and 10 represents a round nail.

DETAILED DESCRIPTION OF THE EMBODIMENTS

Figure 1:
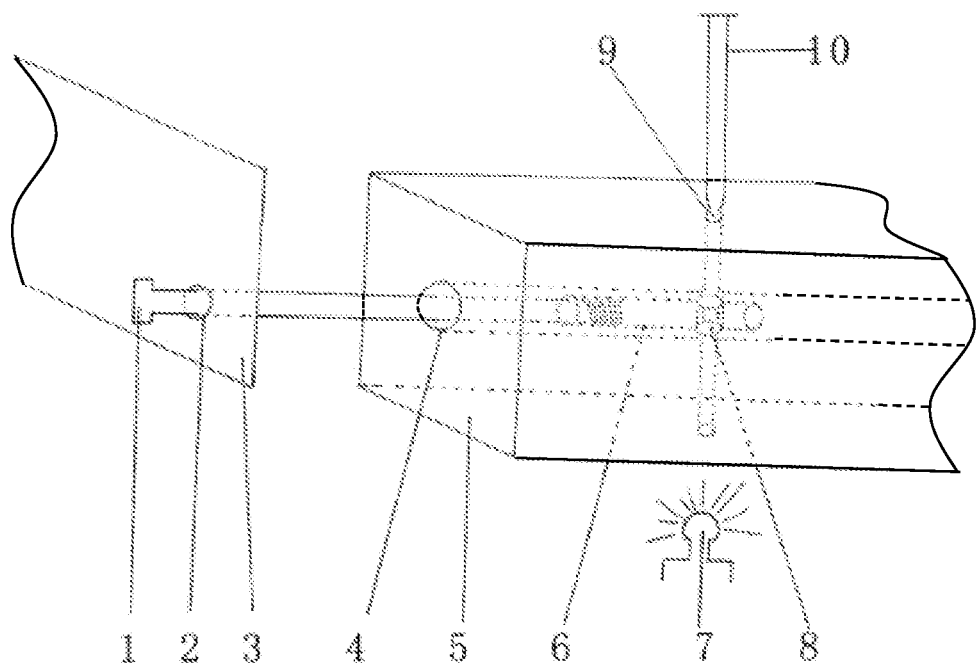
FIG. 1 is a schematic diagram of a novel connection structure for a woodware part.
Figure 2:
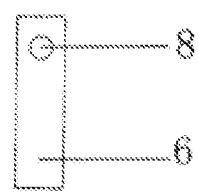
FIG. 2 is a front view of a wooden nut.

In FIG. 1, at first, a second woodware part (5) is fixed on a worktable, and one end having no nail penetration hole (8) of a wooden nut (6) is screwed in a fixing bolt and is screwed down. Then, the fixing bolt is picked up by a left hand, the wooden nut (6) is inserted into an implanting hole (4) of the second woodware part (5), and the distance from the left hand finger to the central line of the nail penetration hole (8) is equal to the distance from the central line of an embedding hole (9) to the contact surface of the second woodware part (5); and the wooden nut (6) is rotated when looking downwards until the diameter of a facula is equal to the diameter of the embedding hole (9), so as to fix the wooden nut (6). A round nail (10) is inserted into the embedding hole (9), the round nail (10) is impacted into the embedding hole (9) by a woodworking hammer by a right hand, and the wooden nut (6) is fixed in the implanting hole (4) of the second woodware part (5) by the round nail (10) through the nail penetration hole (8). Finally, a bolt (1) is screwed in the wooden nut (6) in the implanting hole (4) of the second woodware part (5) through a bolt hole (2) of a first woodware part (3) to connect the first woodware part (3) and the second woodware part (5).

The invention claimed is:

1. A method of connecting first and second woodware parts, comprising:
   providing a first woodware part having opposing sides and a bolt hole extending therebetween, one of the sides defining a contact surface;
   providing a second woodware part having a contact surface disposed at a longitudinal end thereof, an implanting hole extending through the contact surface and along a longitudinal axis of the second woodware part, and an embedding hole extending through opposing sides of the second woodware part, a central line of the embedding hole and a central line of the implanting hole being perpendicular to and intersecting with each other;
   providing a wooden nut having a threaded hole and a nail penetration hole extending through opposing sides of the nut and intersecting the threaded hole;
   providing a round nail;
   placing a light source below the embedding hole of the second woodware part;
   providing a fixing bolt having a threaded first end and a head disposed at a second end thereof;
   screwing the first end of the fixing bolt into the wooden nut and inserting the nut into the implanting hole via the fixing bolt until a distance from the head of the fixing bolt to a central line of the nail penetration hole is equal to a distance from the central line of the embedding hole to the contact surface of the second woodware part such that the central line of the embedding hole and the central line of the nail penetration hole of the nut are overlapped;

rotating the wooden nut via the head of the fixing bolt until a diameter of a facula of the light source is equal to a diameter of the embedding hole; and fixing the wooden nut within the second woodware part via insertion of the nail through the embedding hole in the second woodware part and the nail penetration hole in the nut, and removing the fixing bolt from the wooden nut, wherein the connection of the first and second woodware parts is realized by abutting the contact surfaces of the first and second woodware parts and screwing a fastening bolt into the wooden nut through the bolt hole in the contact surface of the first woodware part.

* * * * *